United States Patent
Li et al.

(10) Patent No.: US 11,275,832 B2
(45) Date of Patent: Mar. 15, 2022

(54) REAL-TIME THREAT ALERT FORENSIC ANALYSIS

(71) Applicant: NEC Laboratories America, Inc., Princeton, NJ (US)

(72) Inventors: Ding Li, Franklin Park, NJ (US); Kangkook Jee, Princeton, NJ (US); Zhichun Li, Santa Clara, CA (US); Zhengzhang Chen, Princeton Junction, NJ (US); Xiao Yu, Princeton, NJ (US)

(73) Assignee: NEC Corporation

( * ) Notice: Subject to any disclaimer, the term of this patent is extended or adjusted under 35 U.S.C. 154(b) by 123 days.

(21) Appl. No.: 16/781,366

(22) Filed: Feb. 4, 2020

(65) Prior Publication Data

US 2020/0250308 A1    Aug. 6, 2020

Related U.S. Application Data (60) Provisional application No. 62/800,611, filed on Feb. 4, 2019.

(51) Int. Cl.
*G06F 21/55* (2013.01)
*G06F 21/56* (2013.01)

(52) U.S. Cl.
CPC ............ *G06F 21/554* (2013.01); *G06F 21/56* (2013.01); *G06F 2221/034* (2013.01)

(58) Field of Classification Search
CPC ... G06F 21/554; G06F 21/56; G06F 2221/034
See application file for complete search history.

(56) References Cited

U.S. PATENT DOCUMENTS

| | | | | |
|---|---|---|---|---|
| 9,742,788 | B2 * | 8/2017 | Hassanzadeh | G06F 21/64 |
| 10,205,735 | B2 * | 2/2019 | Apostolopoulos | G06F 16/9024 |
| 10,956,566 | B2 * | 3/2021 | Shu | G06F 21/554 |
| 2014/0009257 | A1 * | 1/2014 | Mattern | G07C 9/27 340/5.2 |
| 2019/0132344 | A1 * | 5/2019 | Lem | G06N 5/003 |
| 2021/0092137 | A1 * | 3/2021 | Sarpatwar | G06N 7/005 |

OTHER PUBLICATIONS

Hofmeyr, S. et al., "Intrusion detection using sequences of system calls" J. Comput. Secur. (Aug. 1998) pp. 1-25.

Lee, W. et al., "Data mining approaches for intrusion detection" USENIX Security Symposium (Jan. 1998) pp. 1-16.

Tandon, G. et al., "On the learning of system call attributes for host-based anomaly detection" International Journal on Artificial Intelligence Tools (Dec. 2006) pp. 1-18, vol. 15, No. 6.

(Continued)

*Primary Examiner* — Christopher A Revak
(74) *Attorney, Agent, or Firm* — Joseph Kolodka (57) ABSTRACT

Methods and systems for security monitoring and response include assigning an anomaly score to each of a plurality of event paths that are stored in a first memory. Events that are cold, events that are older than a threshold, and events that are not part of a top-k anomalous path are identified. The identified events are evicted from the first memory to a second memory. A threat associated with events in the first memory is identified. A security action is performed responsive to the identified threat.

18 Claims, 5 Drawing Sheets

(56) References Cited

OTHER PUBLICATIONS

Sekar, R. et al., "A fast automaton based method for detecting anomalous program behaviors" IEEE S&P (May 2001) pp. 1-12.

Hu, W. et al., "Robust anomaly detection using support vector machines" In Proceedings of the International Conference on Machine Learning (Jun. 2003) pp. 1-7.

Wu, J. et al., "Network intrusion detection based on a general regression neural network optimized by an improved artificial immune algorithm" PloS One (Mar. 2015) pp. 1-13, vol. 10, No. 3.

Sommer, R. et al., "Outside the closed world: On using machine learning for network intrusion detection" IEEE Symposium on Security and Privacy (May 2010) pp. 1-12.

Harang, R. et al., "Burstiness of intrusion detection process: Empirical evidence and a modeling approach" IEEE Transactions on Information Forensics and Security (May 2017) pp. 1-12, vol. 12, No. 10.

* cited by examiner

REAL-TIME THREAT ALERT FORENSIC ANALYSIS

RELATED APPLICATION INFORMATION

This application claims priority to U.S. Provisional Patent Application No. 62/800,611, filed on Feb. 4, 2019, incorporated herein by reference herein its entirety.

BACKGROUND

Technical Field

The present invention relates to advanced persistent threat detection, and, more particularly, to the detection of threats by tracking and correlation of highly anomalous events.

Description of the Related Art

Attacks on computer systems that take place over a long period of time are known as advanced persistent threats (APTs). These attack campaigns are customized to a target and can take place over the course of months. Keeping track of events in an APT attack can be difficult, as tremendous amounts of data can be collected over the lifetime of such an attack. Threat detection software are used to protect against APTs, and aid in detecting, analyzing, investigating, and responding to an attack.

SUMMARY

A method for security monitoring and response includes assigning an anomaly score to each of a plurality of event paths that are stored in a first memory. Events that are cold, events that are older than a threshold, and events that are not part of a top-k anomalous path are identified. The identified events are evicted from the first memory to a second memory. A threat associated with events in the first memory is identified. A security action is performed responsive to the identified threat.

A system for security monitoring and response includes a first memory that stores a plurality of event paths and a second memory. An event aggregator is configured to assign an anomaly score to each of the plurality of event paths. A memory manager is configured to identify events that are cold, events that are older than a threshold, and events that are not part of a top-k anomalous path, and to evict the identified events from the first memory to a second memory. A threat detection system is configured to identify a threat associated with events in the first memory. A security manager is configured to perform a security action responsive to the identified threat.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention use efficient, in-memory data structures to provide correlations between advanced persistent threat (APT) events in real-time. An anomaly score is used to store only the most suspicious events, so that alerts can be tracked without exploring the entire provenance chain. Threat alerts that are related to true attacks have high anomaly scores and, thus, by tracking highly anomalous candidate paths, investigation queries can be answered efficiently.

In addition, logical connections between alerts, and thus the attack strategies being the alerts, can be discovered using alert correlation across the long time span of an APT. The present embodiments generate a smart hyper-alerts graph (HAG), which clusters highly anomalous, correlated alerts together. An HAG provides a high-level view of correlated alerts, with summarized dependency paths between them. The HAG is thus a significant investigative tool that can be used to rapidly assess and respond to APTs.

Figure 1:
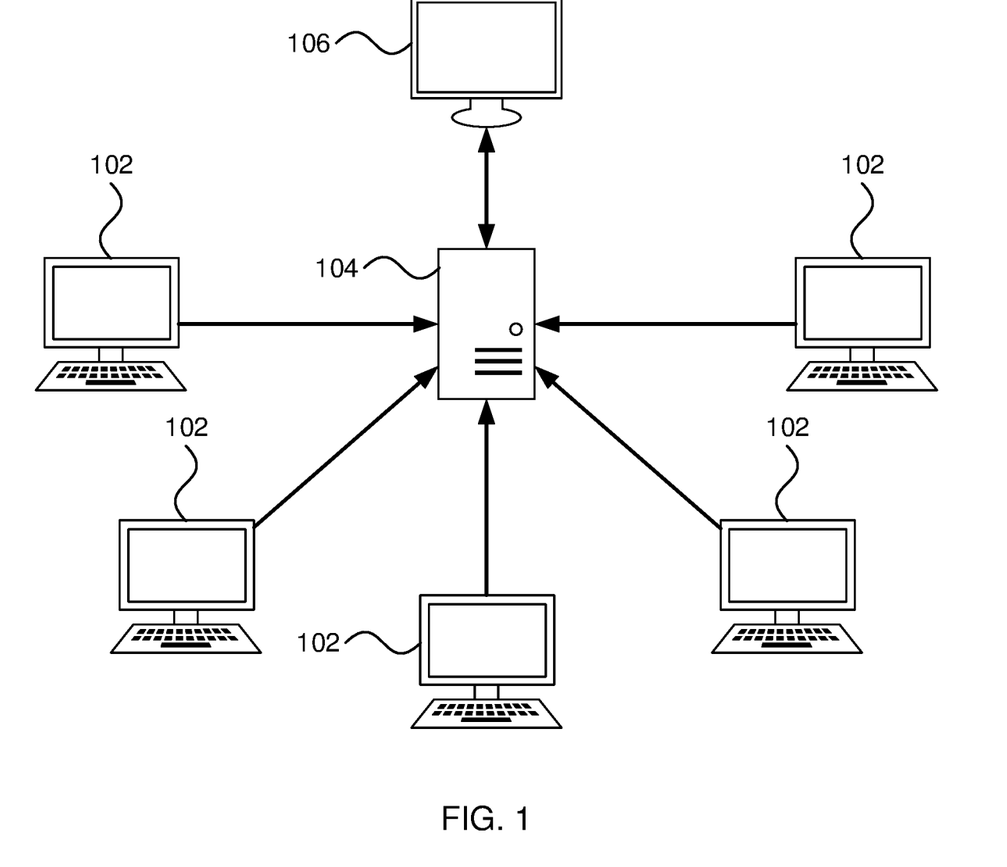
FIG. 1 is a diagram of an exemplary enterprise network that includes monitored systems that report event information to a security system, where the security system uses efficient, in-memory data structures to provide correlations between advanced persistent threat (APT) events in real-time, in accordance with an embodiment of the present invention.

Referring now in detail to the figures in which like numerals represent the same or similar elements and initially to FIG. 1, a high-level system for APT detection is illustratively depicted in accordance with one embodiment of the present principles. A number of monitored systems 102 communicate with a security system 104. The monitored systems 102 can include any networked device or appliance, for example including a desktop computer; a laptop; a mobile device; a server; network infrastructure, such as a router, switch, gateway, bridge, or access point; or a peripheral, such as a printer or scanner. The monitored systems 102 can be connected in any networked arrangement, for example connecting through a local area network (LAN), wide area network (WAN), cell network, the Internet, or any other wired or wireless communication medium and protocol.

The security system 104 collects information from the monitored systems 102. This information includes event information relating to internal and external processes that are logged at the monitored systems 102. These events can include, for example, events generated by hardware components, by operating system components, by applications, by user interfaces, and by network accesses. For example, login attempts at monitored systems 102 can be logged and forwarded to the security system 104. In general, the collected information can include information regarding system objects (e.g., files) and subjects (e.g., processes).

The security system 104 performs an analysis on the collected information, as described herein, for example providing information regarding the root cause of a particular attack and its ramifications. The security system 104 communicates with a security console 106, which can provide an interface that a human operator can use to review security information related to an APT, to receive alerts, and to take corrective action. The security system 104 can also communicate with the security console 106 to automatically take corrective action in certain circumstances.

Early detection and real-time investigation are useful when fending off attackers and responding to threat alerts. Provenance-based tracking can be used to detect and investigate these threat alerts. However, enterprises generate an overwhelming number of high-speed alerts, accompanied with an enormous amount of provenance data, which makes it challenging to detect and investigate attack while attack is happening. An enterprise network can include thousands of monitored systems 102, each of which can be generating data constantly.

The present embodiments therefore provide a provenance tracker in the security system 104, which provides high throughput provenance tracking over streaming provenance data and low-latency forensic analysis for threat alerts. The provenance tracker uses in-memory key-value storage that keeps certain provenance data, and sends the rest of the data to the disk. To decide which provenance data is send to the disk, the present embodiments use asynchronous eviction, tailored for forensic analysis, which separates provenance tracking from traditional memory eviction strategies.

For example, in some experiments the present embodiments have shown a throughput of 92 Events/ms, which is a substantial improvement over the state of the art. Furthermore, the present embodiments reconstruct most attack scenarios many times faster than the existing solutions. Evaluation on real-world APT attacks has shown that the present embodiments kept all the critical events related to attacks in the main-memory at all the time, using relatively little memory. The present embodiments can furthermore answer alert correlation queries in near real-time.

Three observations underlie the determination of which events to keep in main memory and which to store on disk:

First, the epochal causality hypothesis states that vertices which are recently accessed during causal graph generation are accessed again in a short epoch of time ($\Delta T_{promote}$), and thus should not be evicted from the cache in that epoch. In other words, provenance graph vertices often exhibit some temporal locality. Based on this hypothesis, events belonging to epoch in the memory can be stored to guarantee high throughput for provenance data ingestion.

Second, there are certain vertices in a provenance graph which are accessed more often. These vertices have a high fan-out and are referred to herein as "hot vertices," while all other vertices are referred to as "cold vertices." A small number of vertices have a large number of outgoing event connections, while a large number of vertices have a very small number of fan-out events.

Third, true threat alerts generated by underlying threat detection software are causally related to most anomalous paths in the provenance graph. By tracking only these anomalous paths, the present embodiments can track the provenance of true threat alerts, since they are related to most anomalous paths. The present embodiments therefore keep the vertices belonging to most anomalous paths in the memory, ensuring that paths can be returned in real-time.

Accordingly, the present embodiments can periodically evict three types of vertices, including cold vertices, old vertices (vertices which have not been accessed recently), and vertices that do not belong to anomalous paths. The data eviction aims to remove events which do not have a causal relation with any other recent event, and thus are not expected to have causality in near future, and to remove events which do not contribute to anomalous paths.

As used herein, a causal or provenance event is denoted as $e_1$ (src, dst, t), representing a record that includes a source entity src, a destination entity dst, and a timestamp t that indicates when the record $e_1$ was generated. Provenance data can be represented as a directed graph G<V, E>, where V represents such entities as processes, files, and network sockets, and E represents the causal relationship between different events. In an attack investigation, an investigator can start from a symptom or threat alert, and can query the underlying provenance tracking information to identify the root cause and the ramifications of that symptom. The present embodiments can perform backward tracking and forward tracking on the provenance data to generate a provenance graph of a threat alert.

Figure 2:
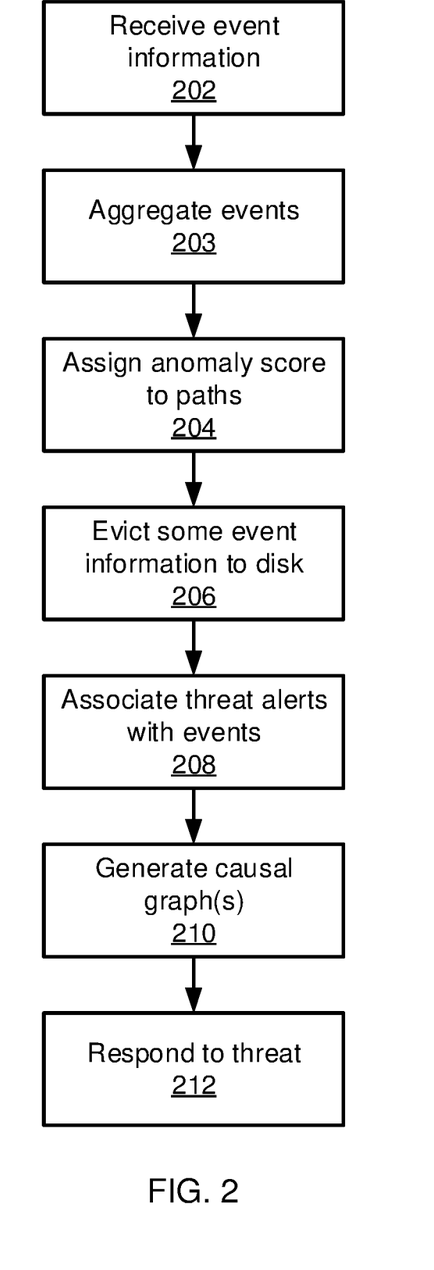
FIG. 2 is a block/flow diagram of a method for detecting and responding to APT events using efficient, in-memory data structures in accordance with an embodiment of the present invention.

Referring now to FIG. 2, a diagram of the detection and response to an APT is shown. Block 202 receives event information at the security system 104 from the various monitored systems 102. This may include, for example, audit logs that include provenance data, and may be collected as a stream (e.g., on an ongoing basis). In some embodiments, audit logs can be streamed from many different locations in an enterprise network to an event broker, and can then be divided up based on host identifiers. Block 202 can thus parse the audit logs and generate causality between different events in the main memory.

Block 203 aggregates the incoming events. The events can be sorted according to their timestamps and then aggregated according to shared source and destination identifiers. This helps reduce the number of events because some operations can induce a long sequence of events. For example, a single write operation can cause a number of subsequent write file events. This aggregation does not break the correctness of the causality analysis. Block 203 can further loop over each arriving event e in a time window $W_e$ and extract its source and destination vertices. Block 203 can check whether the source vertex of the event e is already in storage. Block 203 can then create a new entry in a young generation pool if the event is not already in storage. If the event is already in storage, the anomaly scores for all the event's parents are collected, and an aggregate anomaly score for the event e, with the anomaly scores of its parents, can be determined and added to the destination vertex key-value storage.

Block 204 assigned an aggregate anomaly score to the event paths that are received from the monitored systems 102. It should be understood that any appropriate anomaly score metric can be used, but it is specifically contemplated that grammatical inference over provenance graphs can be used to determine anomaly scores for the paths.

Block 206 "evicts" some of the event information from main memory, storing it on a slower, but cheaper storage device, such as a hard disk drive. As will be described in greater detail below, the eviction process is designed to preserve more important event information in main memory, so that events that are more likely to be related to an attack can be accessed quickly.

Block 208 associates particular threat alerts, which may be generated by threat detection software, to specific events in the audit logs. Block 210 generates a causal graph of a threat alert to aid in visualization and response to the alert. Block 212 provides for response to the threat, for example using authentication console 106 to display the causal graph and to receive instructions from a human operator. In some embodiments, block 212 can automatically respond to certain threat information. The response can include a security management action, such as, e.g., shutting down devices, stopping or restricting certain types of network communication, raising alerts to system administrators, changing a security policy level, and so forth.

As used herein, the term "causal path" refers to a path of a causal event $e_a$ and represents a chain of events that led to $e_a$ and a chain of events that result from $e_a$. The causal path P is defined as an ordered sequence of causal events and is represented as $P:=\{e_1, \ldots, e_a, \ldots, e_n\}$, where n is the number of events. Each causal event can have multiple causal paths, where each path represents one possible flow of information through $e_a$.

As used herein, the term "correlated alert path" refers to a sequence of events where at least one event $e_1$ is common to the causal paths of two other events $e_a$ and $e_b$.

As used herein, the term "aggregate anomaly score" refers to an anomaly score of a causal path that is the degree of severity of suspiciousness assigned to the whole causal path by combining anomaly scores of each event in the path.

As used herein, a "young generation pool" includes newly added causal events, while an "old generation pool" includes events which have not been causally accessed for a time longer than a threshold $\Delta T_{promote}$.

Given streaming causal events and parameters k, $\Delta T_{promote}$, and $\Delta T_{evict}$, the present embodiments find and maintain the top k most anomalous causal paths, by evicting N−k anomalous paths after every $\Delta T_{evict}$ time window, where N is the total number of causal paths. Toward that end, the present embodiments calculate and update aggregate anomaly scores of causal paths using streaming causal events, and efficiently evict causal events which are not in the top-k most anomalous paths.

The causal information can be maintained in a causal graph database in main memory, for example using a vertex-centric approach, that supports timed eviction and asynchronous batch writes. Each database entry can be expressed as a key-value pair <K, V>, where key K is an identifier for the vertex V, while the value of V is a list of two entries, including an ordered list of parent tuples $L_{parents}$, including parent vertex identifier, aggregate anomaly sores, relative ranking, and timestamps, and a list of children $L_{children}$ of vertex V, with timestamps for when each was created. The list $L_{parents}$ is ordered based on aggregate anomaly scores, and relative ranking means that, if a certain parent is involved in multiple top-k paths, then the paths having higher scores will be listed first.

Part of the causal graph can be stored in a main memory cache, while the rest of the graph database can be stored on disk. The same representation of the database can be used on-disk as is used in the main memory. A global list $L_s$ can be maintained of the top-k most anomalous paths in the cache at any time. Each entry in this list is a pair of the vertex identifiers where that path ends and its aggregate anomaly score.

Figure 3:
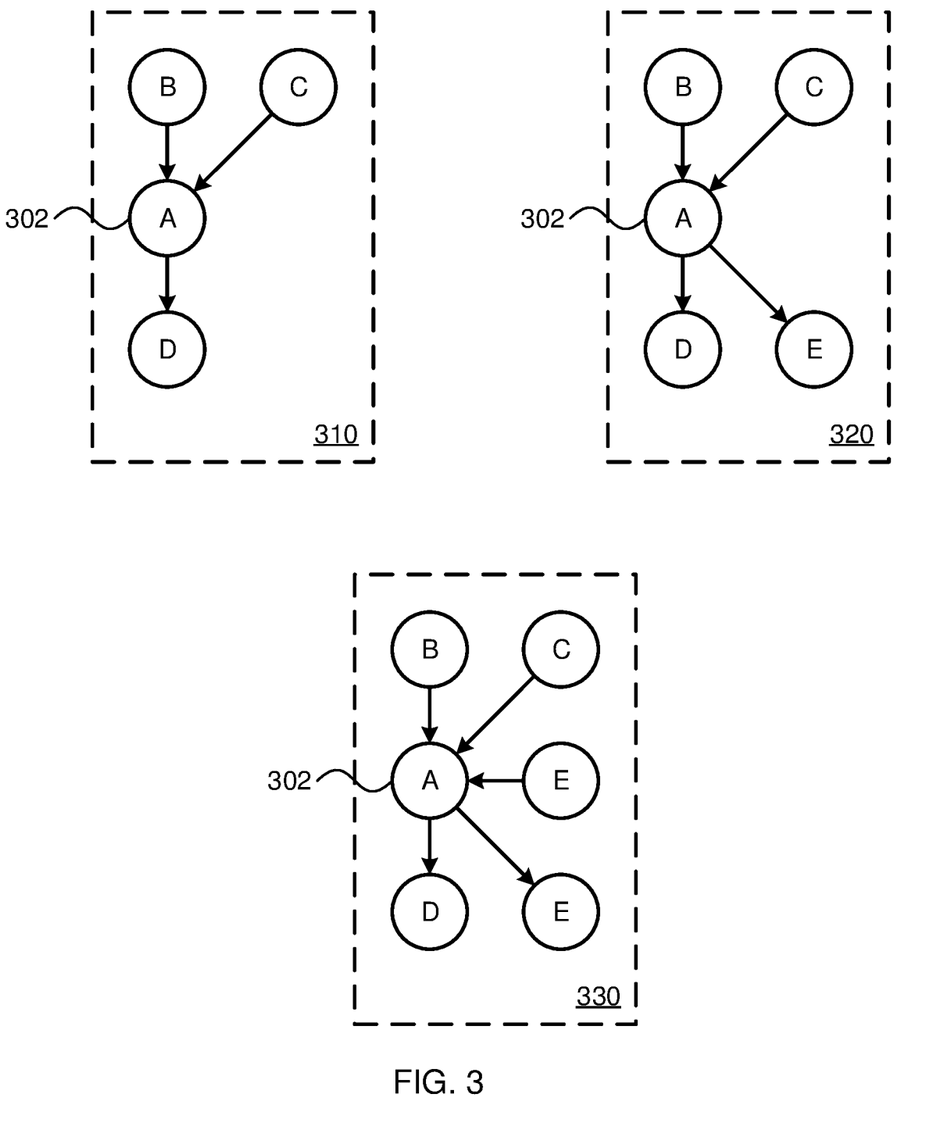
FIG. 3 is a diagram illustrating a causal graph of causal event paths at three different points in time in accordance with an embodiment of the present invention.

Referring now to FIG. 3, an example of aggregate anomaly score assignment is shown. At time $t_1$, the causal graph 310 includes four vertices 302 and a total of two possible paths: $P_1=\{B\rightarrow A\rightarrow D\}$ and $P_2=\{C\rightarrow A\rightarrow D\}$. Both paths are assigned aggregate anomaly scores in block 204, with these scores being denoted $AS_1$ and $AS_2$, respectively. At time $t_2$, a new causal event $e_1$ (A, E, $t_1$) is generated, and the aggregate anomaly scores of the paths that end at vertex E need to be generated.

When a new causal event is added to an existing path, the aggregate anomaly score of the path increases monotonically—in other words, the aggregate value for the path can only increase, never decrease. Thus, for vertex A in this example, subpaths that end at A are B→A and C→A. When event $e_1$ is added, shown in causal graph 320, all the paths of vertex A are concatenated with the event $e_1$ and the aggregate scores of all the paths ending at A are added to event $e_1$. This concatenation creates two additional paths: $P_3=\{B\rightarrow A\rightarrow E\}$ and $P_4=\{C\rightarrow A\rightarrow E\}$. In other words, the top M most anomalous paths ending at the vertex E are generated by concatenating all the M most anomalous paths that end at the parent vertex A with the vertex E.

As the causality increases in the temporal space, such that for two events, $e_1$ and $e_2$, the event $e_2$ can depend on $e_1$ only if $e_2$ occurs after $e_1$. Thus, for an event $e_1$: $V_1 \rightarrow V_2$, if there is another event $e_2$: $V_3 \rightarrow V_1$ that happens temporally after $e_1$, then $e_1$ does not causally depend on $e_2$. In this case, the top k most suspicious paths that end with $V_2$ do not change when the event $e_2$ arrives. This guarantees that scores do not need to be forward propagated again when $e_2$ arrives. Thus, following the present example, when a new event $e_2$ (C, A, $t_2$) arrives, shown in causal graph 330, the aggregate anomaly scores of existing paths $P_1$, $P_2$, $P_3$, and $P_4$ do not need to be changed.

To support epochal causality, the present embodiments run eviction on the old generation pool. Thus, events that are generated or accessed in a particular epoch are never evicted to disk. Events which are older than the epoch are promoted to an old generation pool, where they are subject to eviction. The present embodiments promote events to the old generation pool after every time window $\Delta T_{expire}$, moving vertices from the young generation pool to the old generation pool if they satisfy the following conditions: vertices that have not been accessed for time $T_{expire}$ and that are not in the top-k score list $L_s$. The vertices in $L_s$ are never evicted, since these vertices are used to reconstruct the whole top-k paths. During promotion, the global list is updated with children that were moved to the old generation pool, since these children represent the paths' leaves.

Figure 4:
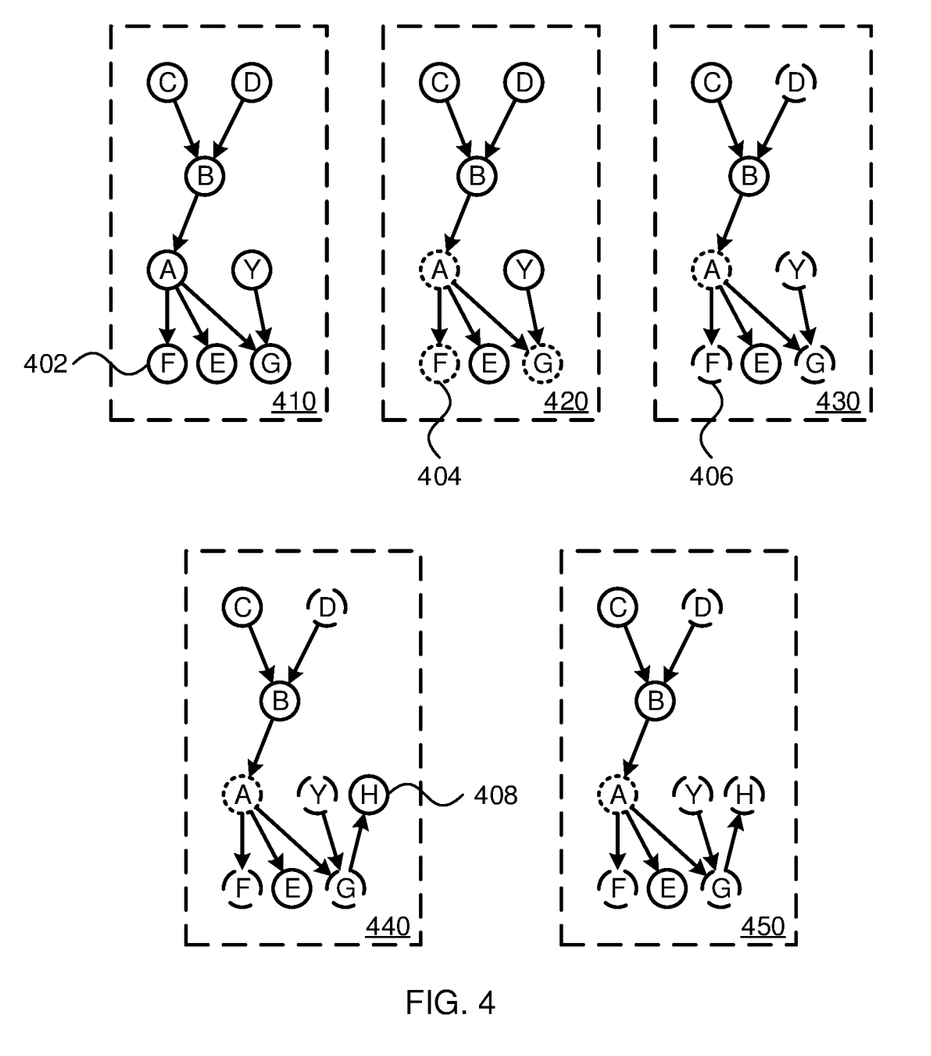
FIG. 4 is a diagram illustrating a causal graph that shows eviction of events from main memory as various points in time in accordance with an embodiment of the present invention.

Referring now to FIG. 4, an example of eviction is shown. In a first causal graph at time $t_1$, a set of events 402 have arrived and are designated as being in the young generation pool (shown with a solid line). The top-1 scoring path ends at the vertex E, for example executing a malicious software program. After a time window $\Delta T_{expire}$ (at time $t_2$), causal graph 420 is shown with all the vertices 404 that satisfy the above conditions being promoted to the old generation pool (shown with a dotted line). In this example, vertices A, F, G, and Y are promoted to the old generation pool.

To further specify the example, the different vertices can represent subjects/objects as follows:
A: /bin/bash
B: /etc/bashrc
C: /bin/pico
D: /bin/scp
E: malware.sh
F: /bin/ls
G: /bin/wget
H: file.txt
Y: 192.X.X.X To maintain high throughput, only some vertices are kept in main memory, while others are evicted to on-disk storage. Eviction can be performed asynchronously, where only one thread from a consumer thread pool runs eviction in the background, after $\Delta T_{evict}$.

As noted above, eviction removes cold vertices, old vertices, and vertices which are not part of most anomalous paths. Eviction runs after every time window $\Delta T_{evict}$, which evicts vertices from the old generation pool to on-disk storage. To ensure that the most anomalous vertices are preserved in main memory, eviction is run at intervals to ensure that only the most anomalous paths remain in the old generation pool. Following the above example, the global top-1 most anomalous path may be C→B→A→E. The top-k paths can be constructed in a backward propagation fashion, and all the parents of a vertex that do not contribute to the top-k paths in $L_s$ can be evicted. To construct the top-k anomalous paths, a hashmap $M_{ord}$ can be constructed with every vertex in the list $L_s$ as a key and with the set of relative ranking it contributes as a vertex. For example, if a leaf vertex Z contributes three paths in the top-k list $L_s$, then the hashmap will include the key as Z and the value as <1,2,3>. Thus, in the third causal graph 430 at time $t_3$, vertices D, F, G, and Y are evicted to on-disk storage, shown as evicted vertices 406 (with dashed lines).

Each of the vertices in the hashmap $M_{ord}$ is backward propagated. A vertex V and its set of relative rankings $Set_{ord}$ are passed. The relative ranking makes it possible to explore only certain parents when backward propagating. This relative ranking hashmap makes it possible to only explore certain parents in the parent list of a vertex V, improving the time complexity of eviction. Since the parents are ordered, the relative ranking is used as an index in the parent list. Thus, $Set_{ord}$ relative rankings are used as indicates in the parent list of vertex V. A new hashmap $M_{ord}$ can be constructed of relative rankings with the new parents, and can be recursively explored.

Once the correct parent for the current score is determined, the parent vertex is marked to prevent its later eviction. Once all the vertices present in $L_s$ have been used to reconstruct the top-k paths, garbage collection is performed to evict all the old generation pool entries which are not so marked.

Following the example of FIG. 4, starting from the vertex E, a path with the highest score that ends at E is recovered. The vertex E has only one parent—vertex A. Similarly, vertex A has only one parent—vertex B. However, vertex B has two parents, C and D. Because C contributes to the scoring path, it is marked to prevent its subsequent eviction. Vertex D is not marked. Thus, in causal graph 430, the vertices that do not belong to this path are evicted from main memory.

Eviction runs in O(N−M) time, since it has to mark all of the vertices which do not belong on the top-k paths, where N is the total number of vertices present in the cache and M is the number of vertices which belong to the top-k path. During path reconstruction, which parents to explore are recovered in O(1) time, because of the ordered parent list and the relative ranking stored with each vertex. Monotonicity of the anomaly scores ensures correctness. For a vertex V, if the parent of V in the causal path is the vertex S, and S has the second largest score among all the paths of vertex V that have S as a parent, then it must be generated from the second largest path of vertex S.

In causal graph 440, at time $t_4$, a new streaming event 408 arrives, e(G, H, $t_4$). In this example, the parent of the new event 408 has already been evicted. The parent vertex then needs to be read from disk storage to calculate the aggregate anomaly score. If the anomaly score is greater than the lowest score in the global anomaly score list $L_s$, then the parent of the new event 408 needs to be loaded back into main memory cache.

At the fifth causal event graph 450, at time $t_5$, because the parent of H is missing from the cache, G is read from disk and used to calculate the aggregate anomaly score of H. In this example, the new score for G is less than the lowest score in $L_s$. Then H is evicted to disk without loading its parent into the main memory cache.

To determine the optimal promotion epoch $\Delta T_{promote}$ for a given dataset, different times can be compared experimentally. Larger values of $\Delta T_{promote}$ lead to a lower miss ratio for the young generation pool, but this also means that more events will be stored in the young generation pool. The optimal $\Delta T_{promote}$ strikes a balance between a low miss ratio and a low size for the young generation pool. In some experiments, an optimal value that provided a low miss ratio and a low maximum young generation pool size was about 800 seconds.

The size of the global list $L_s$ is directly correlated with the number of most anomalous paths that the enterprise wants to store in main memory. An enterprise with larger resources may elect to store a larger number of anomalous paths. However, a larger list size results in a longer time to complete each eviction cycle after every $\Delta T_{evict}$ time window. This does not affect the throughput of the system, because eviction is performed in the background, asynchronously.

The number of alerts that are generated by the threat detection software can also affect the optimal size for the global list. Since threat alerts are related to anomalous behavior, by having a large global list size, more information can be stored in main memory regarding the alerts at any time.

The eviction window $\Delta T_{evict}$ affects how long it takes to complete one eviction cycle. The optimal eviction window balances the maximum number of events that are evicted in a given cycle with the time consumed.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 5:
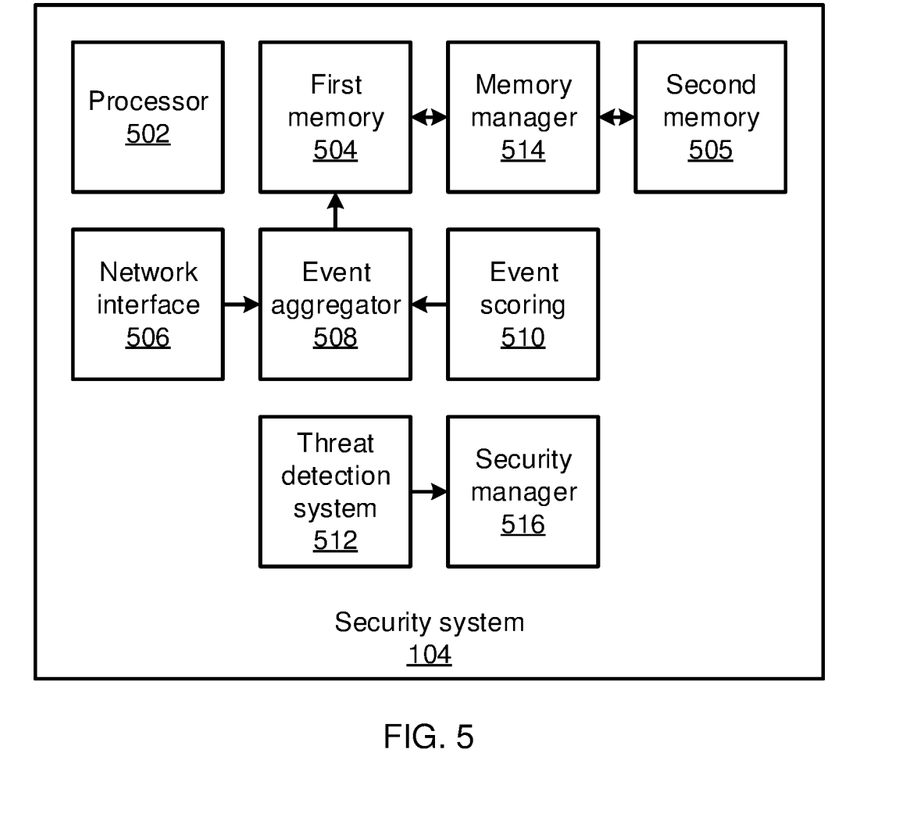
FIG. 5 is a block diagram of a security system for detecting and responding to APT events using efficient, in-memory data structures in accordance with an embodiment of the present invention.

Referring now to FIG. 5, additional detail on a security system 104 is shown. The security system 104 includes a hardware processor 502 that is coupled to first memory 504 and second memory 505. The first memory 504 can be, for example, main system memory such as RAM, with a relatively fast access time, but with a relatively low storage capacity. Second memory 505 can be, for example, a hard disk drive, with a relatively slow access time, but with a relatively high storage capacity. A network interface 506 communicates with one or more monitored systems 102 via any appropriate wired or wireless network medium and protocol.

It should be understood that the functions described herein can be implemented as software that is stored in an appropriate memory and that is executed by hardware processor 502. In some embodiments, the functions can be implemented in the form of one or more hardware components, for example in the form of ASICs or FPGAs.

The network interface 506 receives event information from the monitored systems 102. This information is processed by event aggregator 508, which aggregates related events together and, additionally identifies causal event paths. Event scoring 510 provides an anomaly score for each event, and event aggregator 508 uses these per-event scores to determine aggregated path scores for the causal paths.

New events are stored in the first memory 504. Memory manager 514 determines properties of the events as time progresses, and evicts some events to the second memory 505. In some circumstances, memory manager 514 will read events from the second memory 505 back into the first memory 504, for example if an evicted event becomes part of a highly anomalous path.

A threat detection system 512 performs threat detection on the events and generates threat alerts. Any appropriate threat detection process can be used to achieve this end. When a threat alert is generated, a security manager 516 can efficiently access the most relevant events from the first memory 504, for example generating a causal graph of the pertinent event paths. The security manager 516 can communicate this information to a security console 106 for review and action by a human operator. The security manager 516 can furthermore perform actions directly and automatically to secure the network.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for security monitoring and response, comprising:
   assigning an anomaly score to each of a plurality of event paths that are stored in a first memory;
   identifying events that are cold, events that are older than a threshold, and events that are not part of a top-k anomalous path;
   evicting the identified events from the first memory to a second memory, wherein the first memory has a faster access time than the second memory;
   identifying a threat associated with events in the first memory; and
   performing a security action responsive to the identified threat.

2. The method of claim 1, wherein the first memory is a random access memory and the second memory is disk-based memory.

3. The method of claim 1, wherein identifying events that are cold comprises determining that a number of events that are generated by a given event is below a threshold.

4. The method of claim 1, wherein identifying events that are old comprises moving events from a young generation pool to an old generation pool after a threshold time has passed.

5. The method of claim 1, wherein identifying events that are not part of a top-k anomalous path includes adding a per-event anomaly score for each event in a path to generate an aggregated path anomaly score, wherein the top-k anomalous paths are determined as those k paths having the highest aggregated path anomaly scores.

6. The method of claim 1, further comprising receiving a new event that is generated by an evicted event.

7. The method of claim 6, further comprising:
reading an aggregated path anomaly score for the evicted event from the second memory;
adding a per-event anomaly score for the new event to the aggregated path anomaly score for the evicted event to generate a new path anomaly score; and
comparing the new path anomaly score to top-k aggregated path anomaly scores.

8. The method of claim 7, further comprising evicting the new event, responsive to a determination that the new path anomaly score is lower than the top-k aggregated path anomaly scores.

9. The method of claim 7, further comprising reading the evicted event from the second memory to the first memory, responsive to a determination that the new path anomaly score is higher than at least one of the top-k aggregated path anomaly scores.

10. A system for security monitoring and response, comprising:
a first memory that stores a plurality of event paths;
a second memory, wherein the first memory has a faster access time than the second memory;
an event aggregator configured to assign an anomaly score to each of the plurality of event paths;
a memory manager configured to identify events that are cold, events that are older than a threshold, and events that are not part of a top-k anomalous path, and to evict the identified events from the first memory to the second memory;
a threat detection system configured to identify a threat associated with events in the first memory; and
a security manager configured to perform a security action responsive to the identified threat.

11. The system of claim 10, wherein the first memory is a random access memory and the second memory is a hard disk drive.

12. The system of claim 10, wherein the memory manager is configured to identify events that are cold by determining that a number of events that are generated by a given event is below a threshold.

13. The system of claim 10, wherein the memory manager is configured to identify events that are old by moving events from a young generation pool to an old generation pool after a threshold time has passed.

14. The system of claim 10, wherein the memory manager is configured to identify events that are not part of a top-k anomalous path by adding a per-event anomaly score for each event in a path to generate an aggregated path anomaly score, wherein the top-k anomalous paths are determined as those k paths having the highest aggregated path anomaly scores.

15. The system of claim 10, further comprising a network interface configured to receive a new event that is generated by an evicted event.

16. The system of claim 15, wherein the event aggregator is further configured to read an aggregated path anomaly score for the evicted event from the second memory, and to add a per-event anomaly score for the new event to the aggregated path anomaly score for the evicted event to generate a new path anomaly score, and wherein the memory manager is further configured to compare the new path anomaly score to top-k aggregated path anomaly scores.

17. The system of claim 16, wherein the memory manager is further configured to evict the new event, responsive to a determination that the new path anomaly score is lower than the top-k aggregated path anomaly scores.

18. The system of claim 16, wherein the memory manager is further configured to read the evicted event from the second memory to the first memory, responsive to a determination that the new path anomaly score is higher than at least one of the top-k aggregated path anomaly scores.

\* \* \* \* \*